United States Patent [19]

Evans

[11] Patent Number: 4,511,637
[45] Date of Patent: Apr. 16, 1985

[54] BATTERY LATCH
[75] Inventor: Robert E. Evans, Piney Flats, Tenn.
[73] Assignee: S & S Corporation, Cedar Bluff, Va.
[21] Appl. No.: 539,698
[22] Filed: Oct. 6, 1983
[51] Int. Cl.³ .............................................. H07M 2/10
[52] U.S. Cl. ...................................... 429/100; 429/97; 429/121; 180/68.5
[58] Field of Search .................. 429/97, 99, 100, 121; 180/68.5

[56] References Cited

U.S. PATENT DOCUMENTS

| 1,934,588 | 11/1933 | Butler | 180/68.5 |
| 3,301,712 | 1/1967 | Bach | 429/100 |
| 4,146,682 | 3/1979 | Nakao | 429/97 |

*Primary Examiner*—Brian E. Hearn
*Assistant Examiner*—Stephen J. Kalafut
*Attorney, Agent, or Firm*—R. J. Falkowski

[57] ABSTRACT

A receptacle for retaining a battery case in a battery powered vehicle contains hydraulic cylinders for lowering and raising the battery case into and out of the vehicle. Retaining arms attached to the hydraulic cylinder have retaining lips that are moved by contact with the walls of the receptacle to engage lip extensions on the battery case when the battery case is loaded into the vehicle. Upon removal of the battery case a bias spring swings the retaining arms away from the battery and releases it for removal.

6 Claims, 3 Drawing Figures

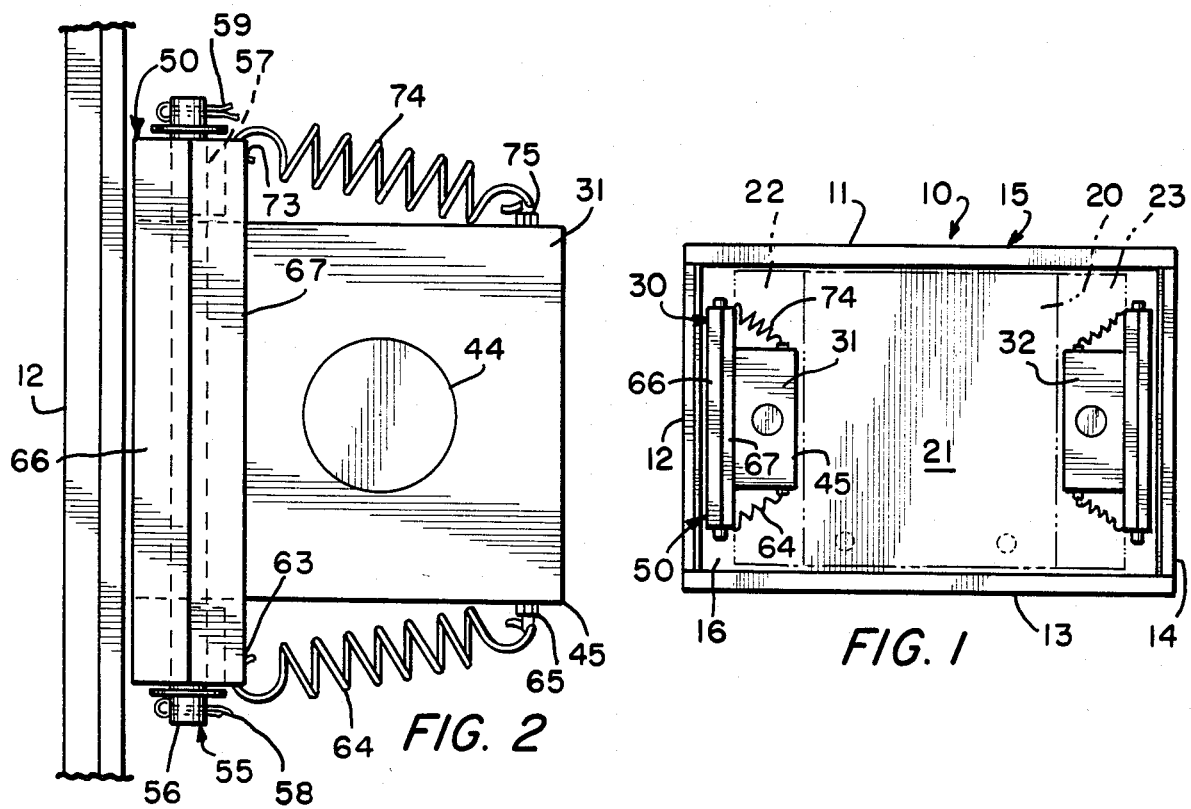
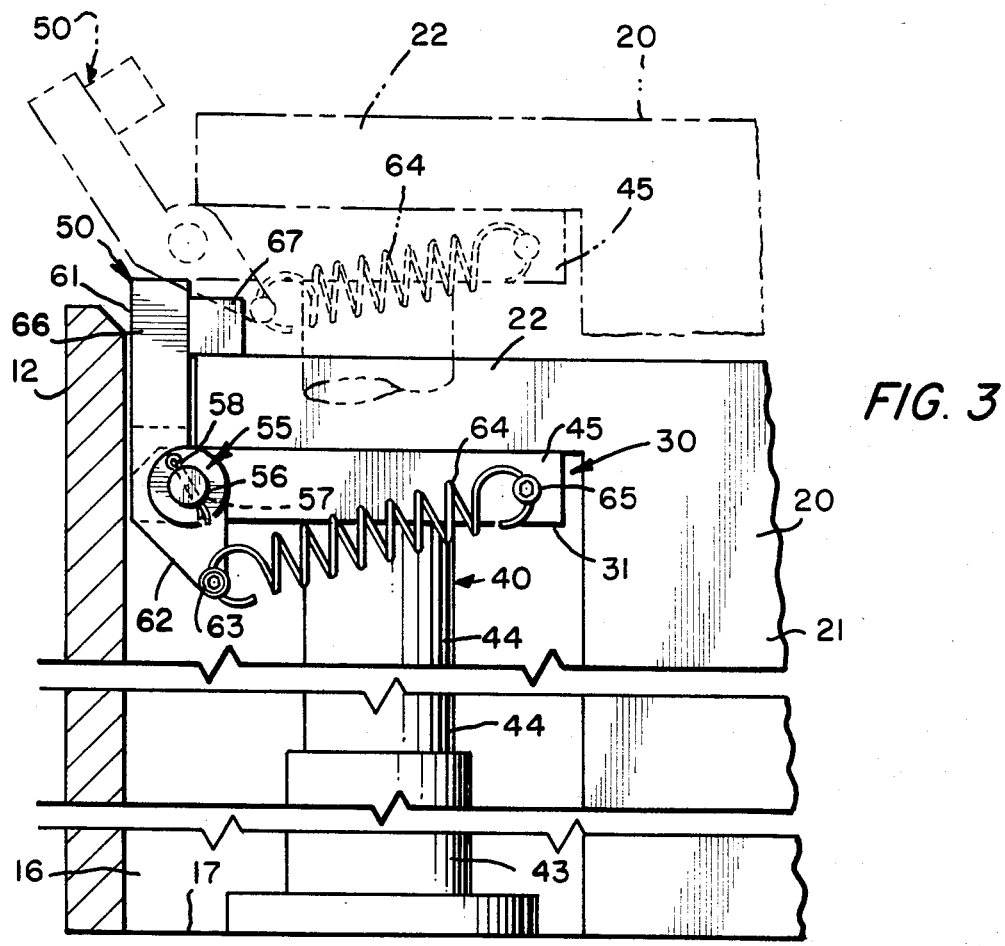

BATTERY LATCH

This invention relates to retaining and removal mechanisms, particularly to retaining mechanisms for electrical batteries in mining machines, or similar vehicles, in which relatively heavy batteries are periodically removed for replacement and recharging.

During operation of industrial vehicles operated by batteries, an important consideration is the capability to easily and quickly change batteries on a work shift or half work shift basis. To accomplish this mechanisms for removing the batteries, which are too heavy to be handled manually, are required. These mechanisms must additionally provide for securing the battery so that it will not be excessively moved during operation of the vehicle. Side to side movement can be controlled by the size of the battery case receptacle but other mechanisms are usually required to keep the battery from moving up and down.

Mechanisms in the prior art accomplishing this are typically spring and toggle arrangements that are difficult and time consuming to use because several steps are typically required to engage and disengage the device on insertion or removal of the battery. Partly as a result of this and other reasons they are usually not reliable and often require significant maintenance.

With this invention a simple battery hold down mechanism is provided that operates automatically upon raising and lowering of the battery to disengage and engage the battery case.

The objects and advantages of this invention will be apparent from the following description of an embodiment of the invention.

FIG. 1 is a simplified top view of a portion of a vehicle, such as a mining vehicle, that contains a box-like receptacle for receiving a battery case and a retaining mechanism according to this invention;

FIG. 2 is a top view of a portion of the retaining mechanism shown in FIG. 1; and FIG. 3 is a side view of the mechanism shown in FIG. 2 showing the retaining mechanism in its closed position and its open position in phantom.

Referring to FIG. 1, a portion of a mining vehicle 10 (shown in part only) comprises a battery receiving section or receptacle 15 having side walls 11, 12, 13, and 14 an a bottom section 16 having a floor plate 17. A battery case 20 (in phantom) is contained within receptacle 15 and comprises a main body 21 and a support section comprising extending lips 22 and 23.

A battery retaining assembly 30 comprises a first retaining mechanism 31 and a second retaining mechanism 32. The two retaining mechanisms are identical in construction and function and operate on each side of the battery case to engage extending lips 22 and 23, respectively, for raising and lowering the battery case. The description of mechanism 31 also applies to mechanism 32.

Referring to FIGS. 2 and 3, retaining mechanism 31 is positioned adjacent side wall 12 and comprises a hydraulic lifting mechanism 40 that extends upwardly from bottom section 16 of the battery receiving section. Hydraulic lifting mechanism 40 extends from a hydraulic cylinder 43 mounted on a bottom plate 17 through a hydraulic rod 44 to an upper support plate 45.

A retaining arm 50 is mounted on support plate 45 at a pivot point 55 by means of a pivot rod 56 passing through a cylindrical passage 57 in support plate 45 and secured in place by cotter pins 58 and 59 passing through holes in the pivot rod by other suitable devices.

Retaining arm 50 has a first end 61 extending above the support plate and a second end 62 extending below the support plate. Toggle points 63 and 73 are connected at the second end and a means for biasing the retaining arm to a final position comprises a bias spring 64 and a bias spring 74 respectively connected between toggle points 63 and 73 and selected points 65 and 75 on the support plate.

Retaining arm 50 has a retaining section 66 with a retaining lip 67 that is adapted to engage extending lip 22 of battery case 20 when in the first position or engaging position as shown in FIG. 3 in solid lines.

Retaining arm 50 is rotatable by the action of the bias springs to force the retaining section of retaining arm 50 outwardly against side wall 12. Upon the extension upwardly of hydraulic mechanism 40 the retaining arm is moved upwardly until it passes over the top of side wall 12. When clear of the wall the springs move the retaining arm from the position shown in solid to the open position shown in phantom thereby freeing the battery for pick up.

In operation, the battery case would be removed, a new battery case reinserted and the hydraulic lifting mechanism would be collapsed to move the support mechanism downwardly. Upon downward movement, retaining arm 50 contacts side wall 12 and moves the retaining arm from the open position to the engaging position as shown to clasp over the top of the extending lip and thereby retain the battery case in position during operation.

I claim:

1. A battery retaining mechanism for a battery powered vehicle comprising:
   a receiving section on the battery powered vehicle adapted to receive a battery case;
   a lifting mechanism comprising a hydraulic cylinder adapted to engage a battery case;
   a retaining arm having a first end movable to a first and second position;
   a means for biasing the retaining arm to the first position;
   said arm positioned on the lifting mechanism so that upon movement into the receiving section contact with the receiving section moves said arm from the first position to the second position; and
   said arm having a retaining section adapted to engage a battery case and positioned so that when said retaining arm is in the second position said retaining section is positioned to engage a battery case and when said retaining arm is in the first position said retaining section is positioned to be disengaged from a battery case.

2. A battery retaining mechanism according to claim 1 wherein said means for biasing comprises a bias spring connected to bias the retaining arm to the first position.

3. A battery retaining mechanism for a battery powered vehicle having a removable battery case adapted to encase a battery, and a battery case receiving section having an upwardly extending side wall, said mechanism comprising:
   a lifting mechanism comprising a hydraulic cylinder positioned adjacent the side wall within the receiving section and positioned to engage the battery case to thereby raise and lower said battery case upon movement of said lifting mechanism;

a retaining arm connected to the lifting mechanism and having a first end and a retaining section adjacent said first end;

a means for biasing the first end outwardly toward said side wall to place said retaining arm in a first position;

said retaining arm positioned on the lifting mechanism adjacent to the side wall so that upon movement of said lifting mechanism said side wall contacts said retaining arm to move said retaining arm inwardly against the bias of the means for biasing and into a second position; and said retaining section positioned on the retaining arm so that when said retaining arm is in the second position said retaining section engages the battery case to prevent substantial upward movement of said battery case and so that when said retaining arm is in the first position said retaining section is disengaged from said battery case.

4. A battery retaining mechanism according to claim 3 wherein said means for biasing comprises a bias spring connected to bias the retaining arm to the first position.

5. A battery retaining mechanism according to claim 3 wherein said battery case has an extending lip; said lifting mechanism is adapted to engage the bottom of the extending lip of the battery case; and said arm retaining section engages the extending lip of the battery case when said retaining arm is in the second position and said retaining section is disengaged from said extending lip of said battery case when said retaining arm is in the first position.

6. A battery retaining mechanism for a battery powered vehicle having a removable battery case adapted to encase a battery, said battery case having an extending lip adapted to support the battery case during insertion and removal of the battery case, and a receiving section on the vehicle adapted to receive the battery case from above, said receiving section having an upwardly extending side wall and a bottom section, said mechanism comprising:

an extendable and contractable hydraulic lifting mechanism positioned adjacent the side wall within the receiving section and extending upwardly from the bottom section and having an upper support plate connected to be moved upon extension and contraction of said lifting mechanism and positioned to engage the extending lip of the battery case to thereby raise and lower said case upon extension and contraction of the lifting mechanism into and out of the receiving section;

a retaining arm extending between a first end positioned above the upper support plate and a second end positioned below said upper support plate and connected to the upper support plate at a pivot point positioned between said first and second end, said arm having a toggle point adjacent said first end and a retaining lip adjacent said second end;

a bias spring connected between the toggle point and a selected position on the upper support plate to thereby bias the second end of the retaining arm inwardly away from the side wall and the first end outwardly toward said side wall to place said retaining arm in a first position;

said retaining arm positioned adjacent to the side wall so that upon movement of the upper support plate downwardly into the receiving section said side wall contacts said retaining arm to move said retaining arm against the bias of the bias spring into a second position; and said retaining lip positioned on the retaining arm so that when said retaining arm is in the second position said retaining lip engages the extending lip of the battery case to prevent substantial upward movement of said battery case relative to the upper support plate and so that when said arm is in the first position said retaining lip is disengaged from said extending lip of the battery case to free said battery case for upward movement.

* * * * *